(12) United States Patent
Goldman et al.

(10) Patent No.: US 6,755,154 B1
(45) Date of Patent: Jun. 29, 2004

(54) DISPLAY AQUARIUM FOR SMALL FISH

(75) Inventors: Marvin A. Goldman, North Hills, NY (US); Gerald A. Phillips, Wantagh, NY (US)

(73) Assignee: Penn-Plax, Inc., Garden City, NY (US)

( * ) Notice: Subject to any disclaimer, the term of this patent is extended or adjusted under 35 U.S.C. 154(b) by 0 days.

(21) Appl. No.: 10/444,119

(22) Filed: May 23, 2003

(51) Int. Cl.[7] .............................................. A01K 61/00
(52) U.S. Cl. .................................................... 119/245
(58) Field of Search ................................ 119/245, 246, 119/247, 248, 249, 253, 239, 265, 233; D30/101

(56) References Cited

U.S. PATENT DOCUMENTS

| | | | | |
|---|---|---|---|---|
| 1,333,454 A | * | 3/1920 | Sato | 119/267 |
| D85,201 S | * | 9/1931 | Pomemacki | D30/102 |
| 3,018,758 A | * | 1/1962 | Arnould | 119/265 |
| 3,664,301 A | * | 5/1972 | Morrill | 119/258 |
| 4,236,488 A | * | 12/1980 | Olds et al. | 119/262 |
| 4,728,420 A | * | 3/1988 | Abercia, Jr. | 210/169 |
| 4,754,571 A | * | 7/1988 | Riechmann | 47/59 R |
| 4,920,922 A | * | 5/1990 | Tominaga | 119/265 |
| 5,160,431 A | * | 11/1992 | Marioni | 210/169 |
| 5,172,650 A | * | 12/1992 | Hsu et al. | 119/259 |
| 5,255,811 A | * | 10/1993 | Simon | 119/265 |
| D350,626 S | * | 9/1994 | Ross | D30/101 |
| 5,363,801 A | * | 11/1994 | Watters et al. | 119/452 |
| 5,451,443 A | * | 9/1995 | Wechsler | 428/99 |
| 5,469,811 A | * | 11/1995 | Lin | 119/263 |
| D373,693 S | * | 9/1996 | Elhage | D6/470 |
| 5,690,054 A | * | 11/1997 | Allen | 119/259 |
| 5,957,084 A | * | 9/1999 | Knepp | 119/245 |
| 6,105,535 A | * | 8/2000 | Atamian et al. | 119/6.5 |
| 6,484,669 B1 | * | 11/2002 | Mihlbauer | 119/245 |

\* cited by examiner

*Primary Examiner*—Yvonne R. Abbott
(74) *Attorney, Agent, or Firm*—Kubovcik & Kubovcik

(57) ABSTRACT

A display aquarium for Betta and other small fish which is a transparent housing having an open top and a bottom wall provided with a through hole and a plug or cap for opening and closing the through hole to allow for controlled draining of water and accumulated waste from the aquarium.

18 Claims, 3 Drawing Sheets

US 6,755,154 B1

DISPLAY AQUARIUM FOR SMALL FISH

FIELD OF THE INVENTION

This invention relates generally to aquariums and, more particularly, to a display aquarium for individual small fish such as Siamese fighting fish, or Betta.

BACKGROUND OF THE INVENTION

Display aquariums for small fish, such as Bettas, goldfish, and guppies typically consist of a transparent container closed on the bottom and having a removable lid. With aquariums of this type, frequent water changes are required since there is no filtration. The water changes are usually accomplished by removing the lid and pouring water out of the top of the enclosure. The problem with this technique is that it is difficult to pour the water out without losing the fish. Also, the majority of the fish waste is at the bottom of the enclosure, and by pouring the water out of the container, the relatively top clean water is replaced, but not the dirty water.

OBJECTS OF THE INVENTION

An object of the present invention is to provide a display aquarium for small fish in which water can be easily replaced without fear of losing the fish and which, simultaneously, enables removal of the waste accumulated at the bottom of the tank.

Another object is to provide a display aquarium for small fish which is stackable.

SUMMARY OF THE INVENTION

According to the present invention, the foregoing and other objects are obtained-by a display aquarium for Betta and other small fish which is a transparent housing having an open top and a bottom wall in which is formed a through hole and means for opening and closing the through hole to allow for controlled draining of water and accumulated waste from the aquarium.

In a preferred embodiment of the display aquarium of the present invention, a filter grid is provided on the bottom of the aquarium for supporting waste-adsorbing beads or the like and which provides a space under the filter grid for waste to accumulate.

In another embodiment of the display aquarium of the present invention, a ridge, depression or channel is formed on the lid of the display aquarium and a rim having a shape corresponding to the shape of the ridge, depression or channel and which is engageable therewith is provided on the bottom wall of the aquarium so that two or more of the display aquariums can be stacked on one another.

DESCRIPTION OF PREFERRED EMBODIMENTS

Figure 1:
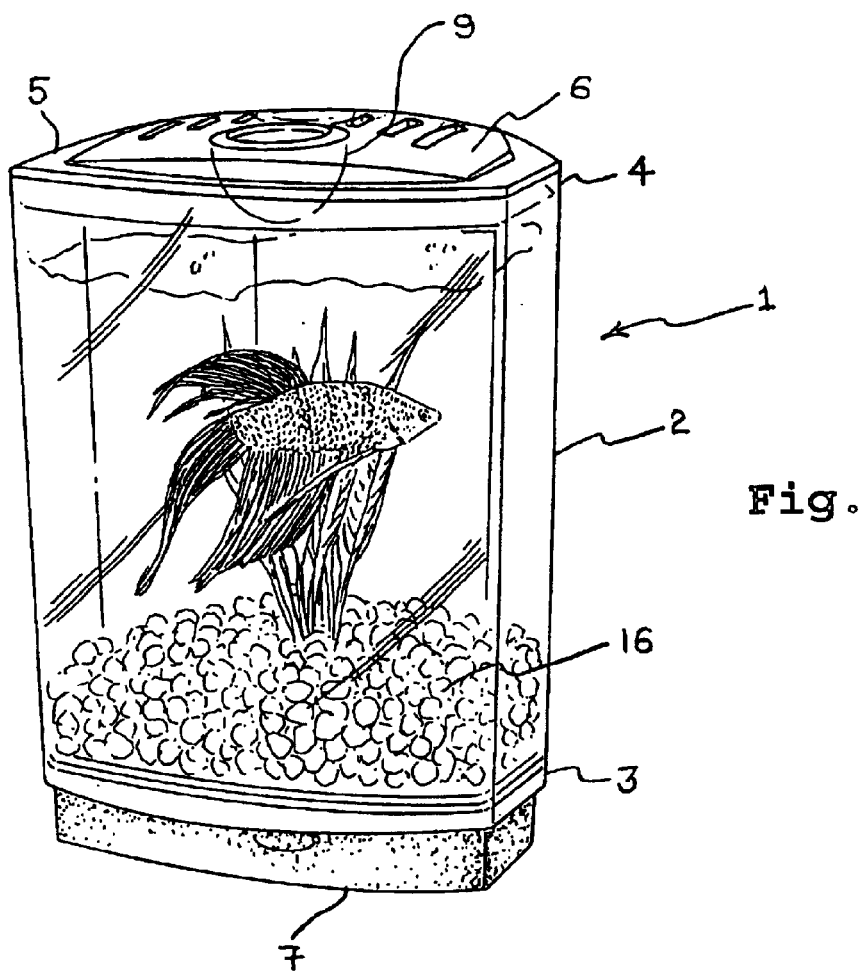
FIG. 1 is a perspective view of an embodiment of the display aquarium of the present invention when used to display a Siamese fighting fish.
Figure 2:
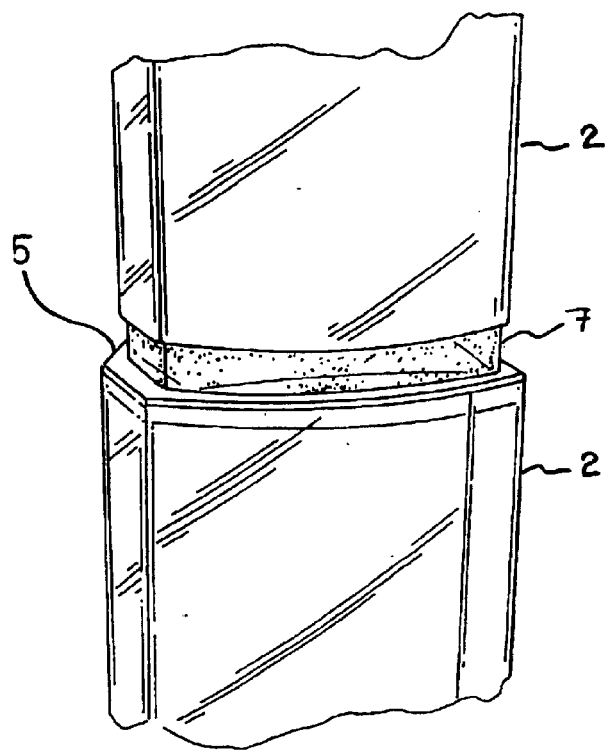
FIG. 2 is a partial perspective view of an embodiment of a display aquarium of the present invention stacked on top of the same embodiment of the display aquarium of the present invention and illustrating the stacking arrangement.

Referring now in detail to the drawings and, initially, to FIG. 1, an embodiment of the display aquarium of the present invention is generally indicated by reference numeral 1. The aquarium includes a transparent housing 2 forming a container having a bottom 3 and a top 4. The top 4 of the housing 2 is open and when in use is covered with a removable lid 5. In a preferred embodiment of the display aquarium of the invention as shown in FIG. 1, lid 5 is provided with a raised portion 6 which forms a ridge and a rim 7 is provided on the bottom 3 of the housing 2 for engaging the raised portion or ridge. The rim 7 has a shape corresponding to the raised portion 6 and ridge of the lid 5. With this preferred construction, display aquariums of the present invention can be securely stacked on top of one another as illustrated in FIG. 2.

The housing and lid of the display aquarium of the present invention are made of a transparent thermoformable plastic such as polystyrene, acrylic resin, polyvinyl chloride resin, polycarbonate resin or the like. The shape of the housing is not limited in so far as the fish to be housed in the aquarium can be displayed and can be in the form of a cylindrical container, a polygonal container or a container having planar and non-planar sides. In the embodiment shown in the drawings, the housing 2 is a multi-walled container having a bow-front 2A, a rear wall 2B, and four side walls 2C, 2D, 2E and 2F (refer to FIGS. 3 and 4). The bow-front provides picture perfect viewing of the fish. Side walls 2C and 2E each form an angle of about 120° with rear wall 2B so that multiple housings can be arranged in adjacent fashion to form circles and half-circles. The walls of the display aquarium can be vertical or, for purposes of aesthetics or to improve stackability, can be angled slightly inwardly from top to bottom.

The size of the housing of the display aquarium is a size in which a small fish can swim comfortably and be best displayed, and with respect to a Siamese fighting fish, or Betta, is of a size which will allow the Betta to flare its fins. Siamese fighting fish typically have a length of between about two and three inches and a container having a height of from five to seven inches and a diameter or width of from three to five inches allow individual Betta to be aesthetically and naturally displayed. As used herein, the "width" of the housing means the width of the housing when viewed from any direction parallel to a surface of water to be contained in the housing. Further, the housing may be adapted to hold multiple Bettas by increasing size and providing dividing walls to form separate living compartments.

Figure 3:
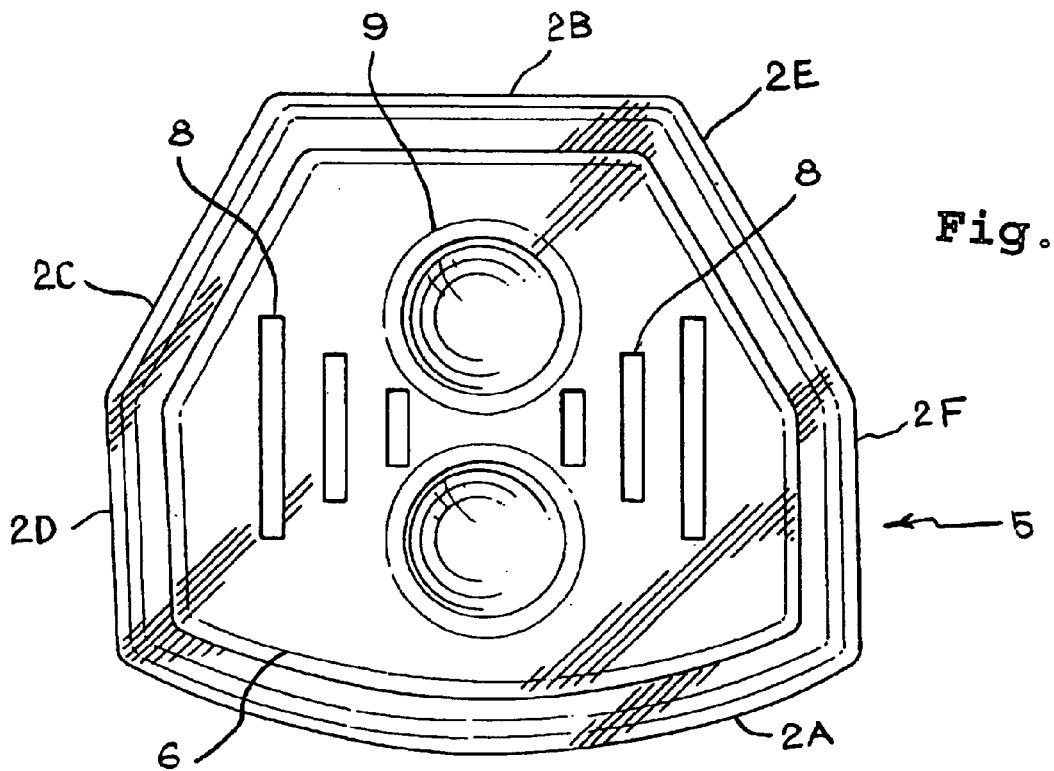
FIG. 3 is a top plan view of the display aquarium of FIG. 1.
Figure 4:
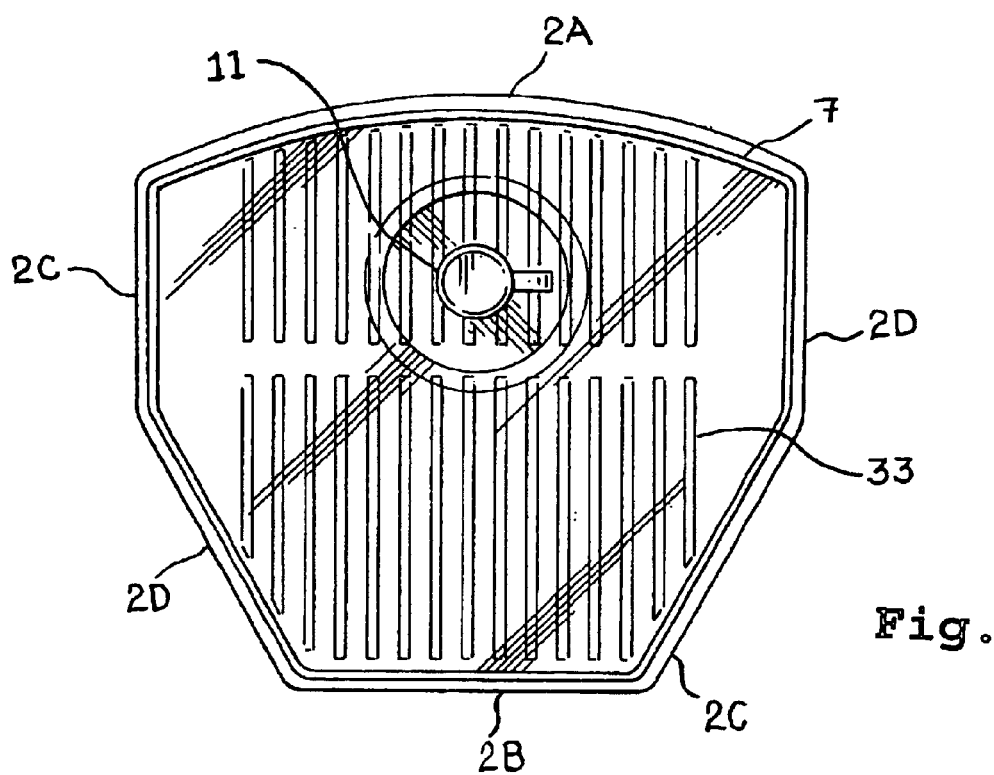
FIG. 4 is a bottom plan view of the display aquarium of FIG. 1.

FIGS. 3 and 4, which are a top plan view and bottom plan view, respectively, of the display aquarium 1 shown in FIG. 1, show that the raised portion 6 provided on the lid 5 and the rim 7 provided on the bottom of the display aquarium have shapes that correspond to each other so as to facilitate stacking. Instead of a raised portion, the lid 5 can have a depressed portion, channel or the like which receives and engages with the rim 7.

Referring to FIG. 3, it is seen that the lid 5 of the display aquarium 1 of the invention is provided with apertures 8 to allow water in the aquarium to contact the air. In the embodiment shown in FIG. 3, the apertures 8 are formed in the shape of slits. However, the apertures 8 are not limited to slits and other apertures such as circular holes or the like can be used. Lid 5 in FIG. 3 is also provided with "finger" depressions 9 which are of a suitable shape, size and spacing for the thumb and a finger of a human hand to fit into to allow easy removal of the lid. In the embodiment of the display aquarium shown in the drawings (refer, specifically, to FIGS. 1 and 3), the depressions 9 are concavities having a semi-spherical surface, but other shapes are possible.

Figure 5:
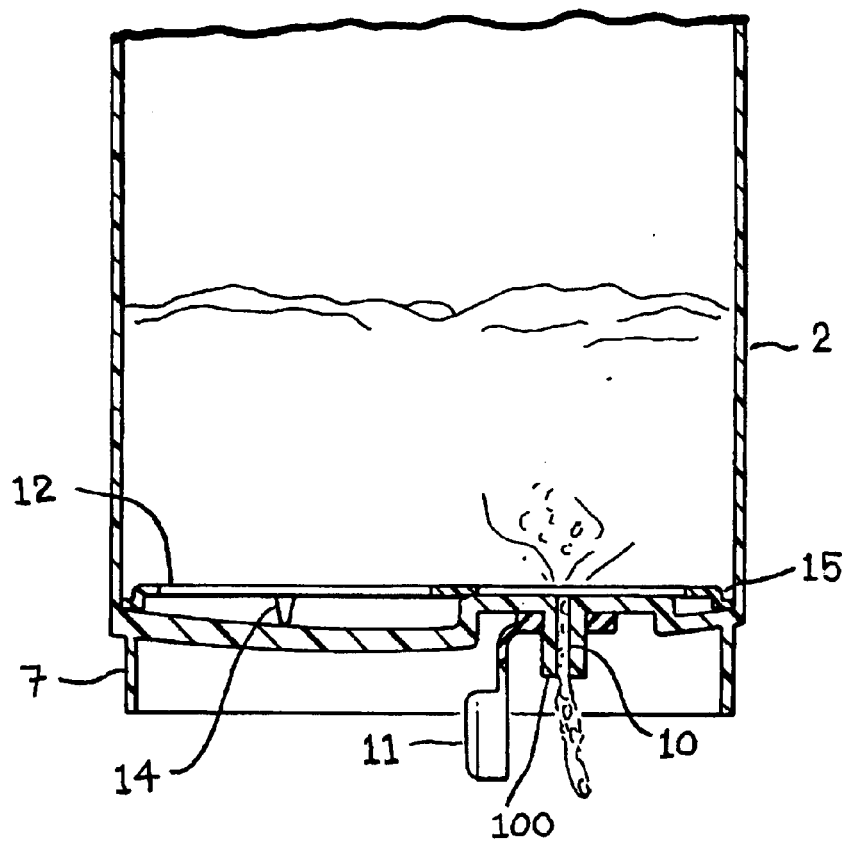
FIG. 5 is vertical cross-sectional view of a portion of the display aquarium of FIG. 1 illustrating the emptying of water through a through hole nozzle provided in the bottom of the aquarium.
Figure 6:
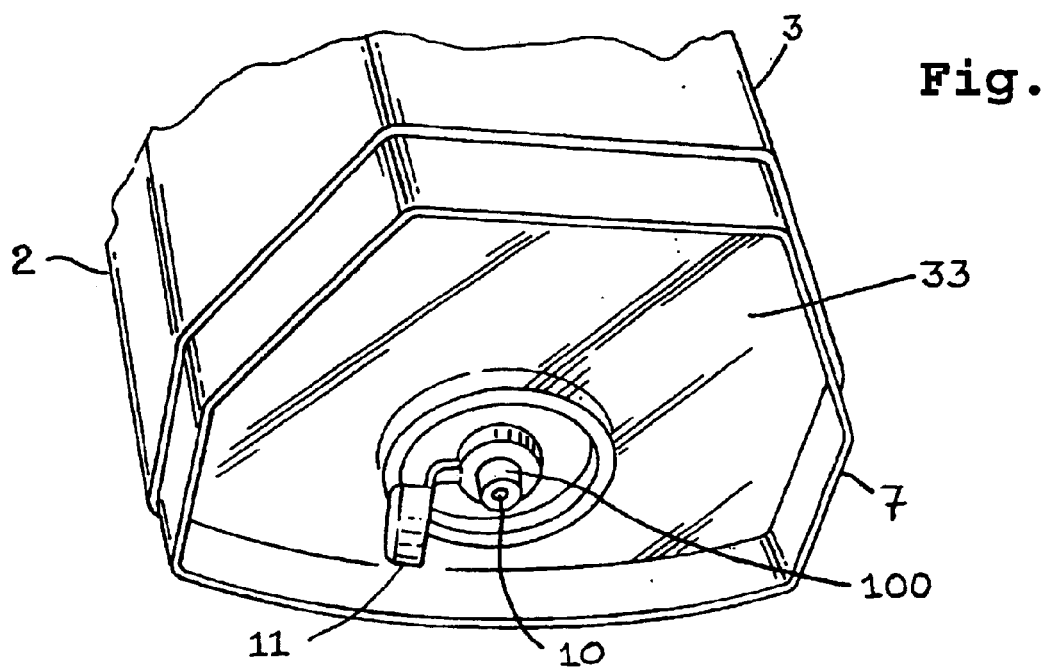
FIG. 6 is bottom perspective view of a portion of the display aquarium of FIG. 1 illustrating the through hole nozzle provided in the bottom of the aquarium and a cap (in an open position) for opening and closing the through hole.

As shown in FIGS. 4–6, the bottom wall 33 of the display, aquarium 1 is provided with a through hole 10 for allowing a portion or all of the water in the aquarium to be removed by draining (as illustrated in FIG. 5) without fear of losing the fish. Additionally, the through hole also allows for removal of waste that has accumulated at the bottom of the aquarium. The through hole 10 has a size that is sufficiently small to allow for controlled drainage of the water, but is sufficiently large for the waste to pass through the hole. A diameter of the through hole 10 of from about 2 to about 6 mm has been found to provide acceptable drainage and removal of waste.

A means for opening and closing the through hole 10 is also provided on the bottom of the display aquarium. The means can be, for example, a plug, if the diameter of the through hole permits, or a cap. It is preferable if the cap is attached to the housing, as shown, to avoid loss. In the embodiment of the display aquarium 1 shown in the drawings, the through hole 10 is provided in the form of a nozzle 100 and the means for opening and closing the through hole is a cap 11 which fits over the nozzle 100. It is noted that the rim 7 provided on the bottom of the display aquarium 1 is of a height that is greater than the length of the nozzle 100 and cap 11 so as to allow the aquarium to rest on the rim.

A filter grid 12 having a shape corresponding to the bottom of the display aquarium 1 is provided in the bottom of the display aquarium 1 and is separated from the bottom wall 33 via pins 14 and a rim 15 provided on the circumference of the filter grid 12. The filter grid 12 provides a support for waste-adsorbing beads 16 or the like which can be provided in the bottom of the display aquarium and has openings 13 which allow waste not adsorbed by the beads to pass through the filter grid 12 and accumulate on the bottom wall 33.

Although the invention has been fully described by way of example with reference to the accompanying drawings, it is apparent that equivalent alterations and modifications will occur to others skilled in the art upon a reading and understanding of the present specification. The present invention is intended to include all such equivalent alterations and modifications.

What is claimed is:

1. A display aquarium for holding and displaying small fish and which comprises:

a transparent housing forming a container having an open top and a bottom wall;

a removable lid covering the open top and having apertures formed therein;

a through hole formed in the bottom wall to allow a controlled amount of water to be removed from the aquarium, said through hole having a diameter of from 2 to 6 mm; and means for opening and closing the through hole.

2. The display aquarium according to claim 1, further comprising a filter grid provided in the bottom of the aquarium and separated from the bottom wall to provide a space for fish waste to accumulate.

3. The display aquarium according to claim 1, further comprising means for nesting the aquarium with another of said aquarium.

4. The display aquarium according to claim 3, wherein the nesting means comprises a raised portion on said lid and a rim provided on said bottom wall and having a shape corresponding to said raised portion.

5. The display aquarium according to claim 3, wherein the nesting means comprises a channel provided on said lid and a rim provided on said bottom wall for engaging the channel.

6. The display aquarium according to claim 3, wherein the nesting means comprises a depression in the lid and a rim provided on said bottom wall which fits into the depression.

7. The display aquarium according to claim 1, wherein the housing has the shape of a cylinder.

8. The display aquarium according to claim 1, wherein the housing has a polygonal shape.

9. The display aquarium according to claim 1, wherein the housing is a multi-walled container having planar and non-planar walls.

10. The display aquarium according to claim 1, wherein the housing has a size and shape suitable for displaying an individual Betta.

11. The display aquarium according to claim 1, wherein the through hole is formed as a nozzle in the bottom wall of the housing and the means for opening and closing the through hole is a cap provided on the nozzle.

12. The display aquarium according to claim 11, wherein the cap is attached to the housing.

13. The display aquarium according to claim 1, wherein depressions having a shape, size and spacing for a thumb and a finger of a human hand to fit thereinto are formed in the lid to allow easy removal of the lid.

14. The display aquarium according to claim 13, wherein the depressions are concavities curved like the inner surface of a sphere.

15. The display aquarium according to claim 1, wherein the housing has a bow-front, a rear wall and four side walls, were each of two side walls attached to the rear wall forms an angle of about 120° with the rear wall.

16. A display aquarium for holding and displaying small fish and which comprises:

a transparent housing forming a container having an open top and a bottom wall, said housing having a height of from five to seven inches and a diameter or width of from three to five inches;

a removable lid covering the open top and having apertures formed therein;

a through hole formed in the bottom wall to allow a controlled amount of water to be removed from the aquarium, said through hole having a diameter of from 2 to 6 mm; and means for opening and closing the through hole.

17. The display aquarium according to claim 16, wherein the through hole is formed as a nozzle in the bottom wall of the housing and the means for opening and closing the through hole is a cap-provided on the-nozzle and attached to the housing.

18. The display aquarium according to claim 16, wherein the housing has a bow-front, a rear wall and four side walls, where each of two side walls is attached to the rear wall and forms an angle of about 120° with the rear wall.

* * * * *